United States Patent [19]

Westerberg

[11] Patent Number: 5,407,587
[45] Date of Patent: Apr. 18, 1995

[54] TRAVELLING DOCTOR BLADE WITH NOZZLE

[75] Inventor: J. Lennart Westerberg, Mobile, Ala.

[73] Assignee: International Paper Company, Purchase, N.Y.

[21] Appl. No.: 107,182

[22] Filed: Aug. 17, 1993

[51] Int. Cl.$^6$ ............................................. B01D 33/06
[52] U.S. Cl. ................................. 210/784; 210/797; 210/396; 210/402; 210/408
[58] Field of Search ............... 210/784, 791, 797, 391, 210/396, 402, 408; 134/42

[56] References Cited

U.S. PATENT DOCUMENTS

| | | | |
|---|---|---|---|
| 793,720 | 7/1905 | Godbe . | |
| 1,627,882 | 5/1927 | Berry . | |
| 2,027,652 | 1/1936 | Raisch | 210/201 |
| 2,060,896 | 11/1936 | Raisch | 210/201 |
| 2,070,074 | 2/1937 | Young | 210/201 |
| 2,363,840 | 11/1944 | Denard | 210/201 |
| 2,395,098 | 2/1946 | Butler | 210/201 |
| 3,075,646 | 1/1963 | Giesse | 210/391 |
| 3,521,751 | 7/1970 | Holthuis | 210/77 |
| 4,261,831 | 4/1981 | Linsenmeyer | 210/391 |
| 4,750,340 | 1/1988 | Anderson | 68/43 |
| 5,143,555 | 9/1992 | Brady | 210/396 |
| 5,149,448 | 9/1992 | Mattelmaki | 210/402 |

Primary Examiner—Ivars Cintins
Attorney, Agent, or Firm—Michael J. Doyle

[57] ABSTRACT

A method and apparatus for removing solids from the porous surface of a rotating vacuum drum. Such drums are used to separate the solid and liquid phases of a slurry, such as a calcium carbonate containing mud slurry. Doctor blades are often used to scrape the drum exterior surface of excess mud to minimize the build up of solids thereon. Nonetheless a cake eventually forms on the drum and clogs the porous surface and stops the vacuum action. The drum is stopped and the drum backwashed by water to dislodge the cake. According to this invention, a jet of water from a nozzle is substantially tangentially directed against the drum surface to thereby eliminate stopping the drum for cake dislodgement. The nozzle is located beneath and moves with a reciprocating secondary doctor blade, the secondary doctor blade being of a length less than the width of the drum. A stationary, main doctor blade spans the entire width of the drum. The nozzle directs the water jet tangentially against that drum surface area scraped by the reciprocating secondary doctor blade and above the main doctor blade. The water jet slightly breaks the vacuum within the drum, but this partial loss has no negative effect on the operation. With the use of this invention, no stoppage of the separating process for backwashing is required.

8 Claims, 2 Drawing Sheets

TRAVELLING DOCTOR BLADE WITH NOZZLE

BACKGROUND OF THE INVENTION

This invention relates to a method and apparatus for separation of the liquid and solid phases of a slurry, such as a calcium carbonate containing mud slurry.

The invention is an improvement over U.S. Pat. No. 5,143,555 issued to Brady and U.S. Pat. No. 3,521,751 issued to Holthuis and EPO Application 454,392 by A. Ahlstrom Corp., all incorporated by reference.

When a vacuum drum is employed to separate the liquid from the solid phase of a two phase mixture, such as a mud slurry, with the drum partially submerged and rotating on a horizontal axis in a slurry vat, a cake of the solid phase material builds up on the porous outer surface of the vacuum drum. A filter cloth is commonly used. One or more knives, termed doctor blades, typically extending the full width of the drum, continuously scrape off a portion of the solid phase or cake, with the scraped off portion falling into the slurry vat in which the drum rotates, for subsequent removal. However, the doctor blade does not continuously scrape all the caked material off of the vacuum drum surface because the blade does not contact the drum surface.

With continued build up of the cake, the separation process must be halted from time to time and the vacuum drum stopped and backwashed, from its inside to its outside, to dislodge the cake from the outer surface of the drum. This stoppage represents a loss of time and is hence more expensive than continuous operation.

The noted Brady patent describes an improvement on conventional vacuum drum and knife arrangements, the Brady method and apparatus employing a second and shorter doctor blade or knife, of substantially less width than that of the drum, and which periodically goes back and forth along the width of the drum, above the stationary doctor blade, to partially scrape off the mud cake. The Brady apparatus and method also requires backwashings but increases the time between them.

The noted Holthuis patent discloses a submerged cake dislodging jet of water periodically movable back and forth along the width of the vacuum drum, the nozzle for the jet located within the slurry vat. The Holthuis nozzle is located beneath the surface of the slurry which is to be separated into its components. However, if agitators are provided in the slurry vat, it would be difficult to incorporate such a submerged nozzle. Further, the location of the nozzle, in the slurry containing vat and below the slurry surface, is an impediment to retrofitting existing vacuum drum installations as well as for nozzle repair or replacement.

Above noted European Patent Application 454,392 shows an arrangement similar to Holthius, except that two reciprocating nozzles are above the slurry level, yet are also positioned within the vat.

In both Holthius and the EPA apparatus, the nozzle discharges a water jet orthogonal to the rotating drum surface. This has a tendency to push the cake back into the filter cloth.

SUMMARY OF THE INVENTION

According to the practice of this invention, one or more nozzles are attached to the apparatus below the shorter, reciprocating doctor blade, as blade 16 of the Brady construction. As the shorter doctor blade executes its motion back and forth along the width of the vacuum drum, the nozzles direct jets of water substantially tangentially to the porous surface of the vacuum drum to dislodge the built up cake of solids over that area scraped by the shorter doctor blade. The liquid jets, typically water, may be actuated with each pass of the shorter doctor blade, or it may be actuated only once every second pass, third pass, and so forth. Typically, the vacuum drum is 8 to 30 feet wide, 8 to 14 feet in diameter, and rotates at an angular speed of 3-6 rpm and has an outer mud layer thickness of 0.625 to 0.5 inches. Mud solids are typically 70-85%. The water jet cleans an area 4 to 6 inches width from a position at about 3 to 5 o'clock on the filter drum circumference. The deflected water and the mud carried by it are washed down behind the stationary blade. The stationary blade hinders the mud and water from splashing out from the filter. The jet water and mud pass down into the vat. The jet water pressure is typically 1,000 to 2,000 psi and the jet discharge volume typically 3-8 gallons per minute.

This jet breaks the vacuum seal within the drum by dislodging the mud from the interstices of the filter cloth, thereby reducing the vacuum about 2 to 4 inches of mercury from a normal value of about 20-23 inches. However, this break in the vacuum has no negative impact on the operation of the apparatus during the separation process.

The jet strikes the drum surface tangentially or substantially tangentially. By the practice of this invention, the need for periodic backwashing is eliminated. Often, the output of the vacuum separator is fed to an apparatus for further treatment. By eliminating the backwash requirement, there is no vacuum separator down time and the benefits of continuous operation are realized.

DETAILED DESCRIPTION OF THE INVENTION

Figure 1:
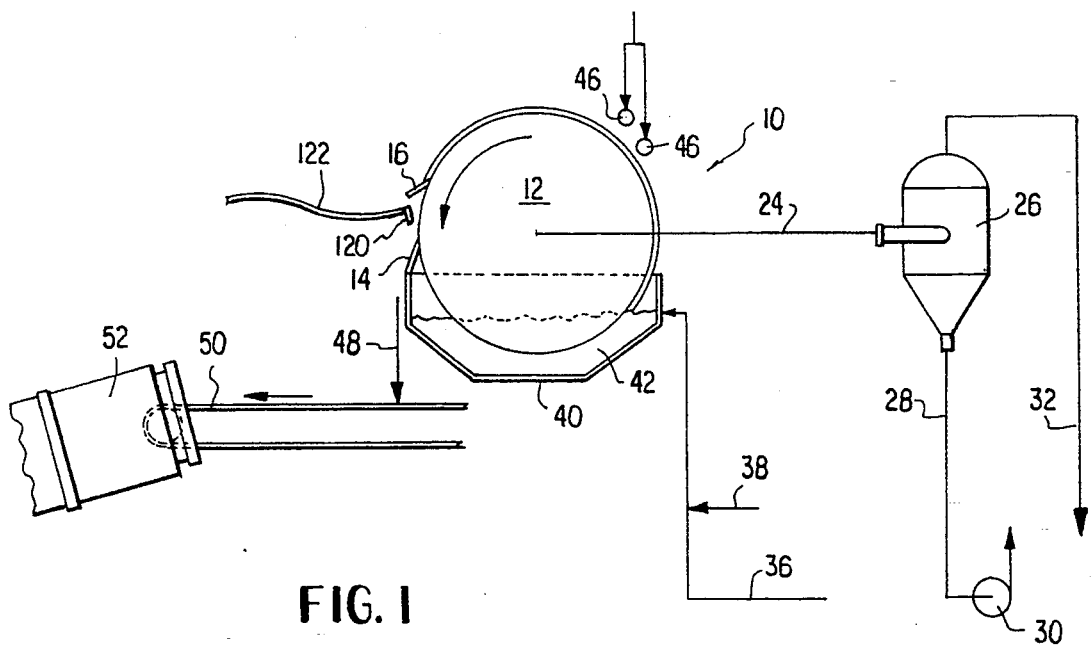
FIG. 1 is a partially schematic view illustrating the prior art, as modified by this invention.

Referring now to FIG. 1 of the drawings, the 10 denotes generally a system or installation in which the present invention is employed. A vacuum drum 12 having a porous surface and rotatable on a horizontal direction rotates in the indicated direction. A stationary doctor blade 14 spans substantially the entire width of drum 12, with travelling doctor blade 16 spanning a significantly smaller width of the drum. Both blades 14 and 16 function to remove a mud coat 18 on an outer side surface of drum 12. A vacuum line 24, schematically designated, couples the interior of porous drum 12 to a vacuum receiver 26, with hydraulic line 28 feeding from receiver 28 to a filtrate and wash system by means of a pump 30. Vacuum line 32 is connected to a vacuum pump, not illustrated, and applies vacuum to receiver 26. A mud slurry, containing lime which is to be recovered, is fed from a tank (not illustrated) through line 36 and may be diluted by injected water from line 38.

Figure 2:
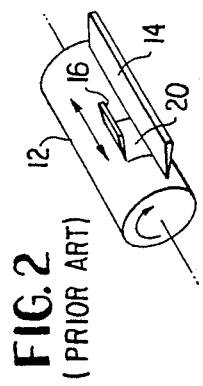
FIG. 2 is a partially schematic view illustrating the basic scraping action of the two doctor blades shown at FIG. 1 and is taken from FIG. 2 of the Brady patent.

Slurry from line 36 feeds into vat 40 to form a volume of mud slurry 42 in the bottom of the vat or tank. During operation, vacuum from the interior of drum 12 results in a depositing of a layer of mud 18 on the outer surface of the rotating drum, with knives 14 and 16 scraping off the mud. Mud layer 18 may be sprinkled with water to assist washing by means of sprinklers indicated at 46. Mud 48 scraped off of the drum falls onto conveyer 50 and into the input to a lime kiln 52 for further treatment. FIG. 2 schematically illustrates the basic action of the two doctor blades and their relation to the vacuum drum but without showing the jets of this invention.

FIG. 1 is similar to FIG. 1 of the noted Brady patent, except for the addition of one or more water jet cleaning nozzles 120 located between the two doctor blades 14 and 16, beneath blade 16, and movable back and forth across the width of the vacuum drum with movement of the travelling doctor blade 16. Nozzles 120 are fed by a pressurized water line 122, with the nozzle jets of water directed substantially tangentially against a side surface portion of rotating vacuum drum 12.

Figure 3:
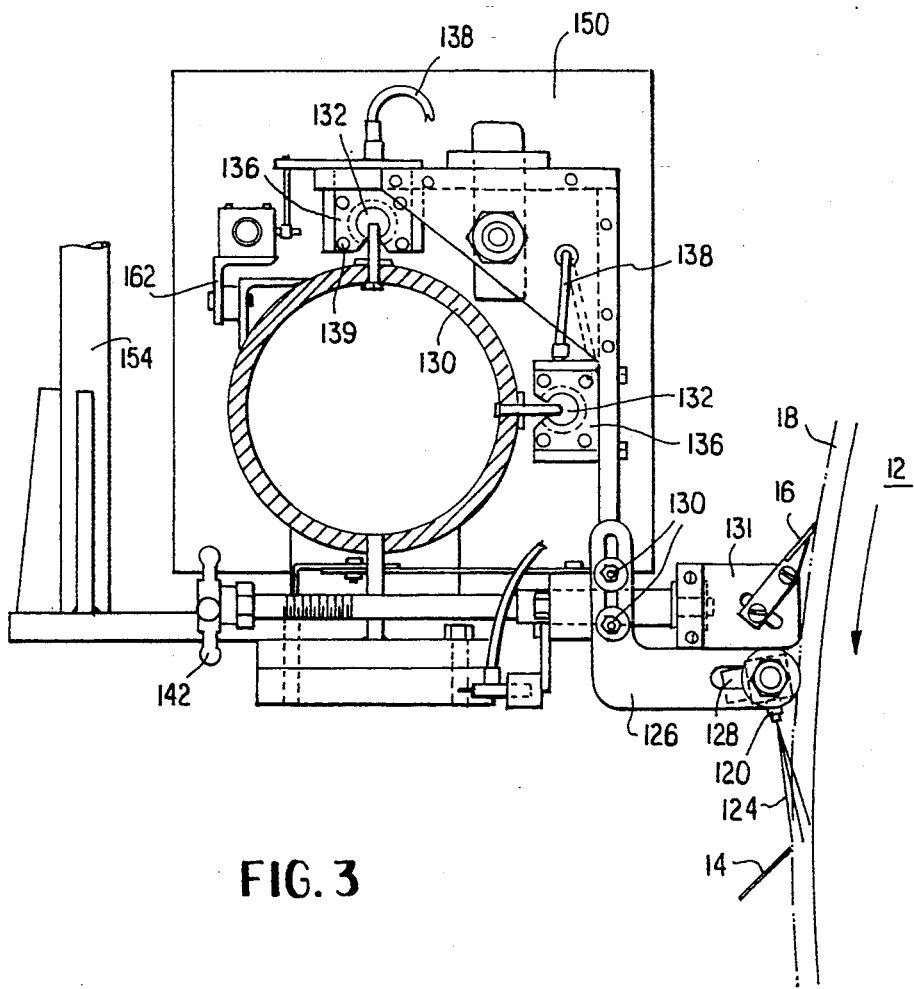
FIG. 3 is a partial end view of the vacuum drum of FIG. 1 illustrating the high pressure wash nozzles of this invention and their location relative to the two doctor blades.
Figure 4:
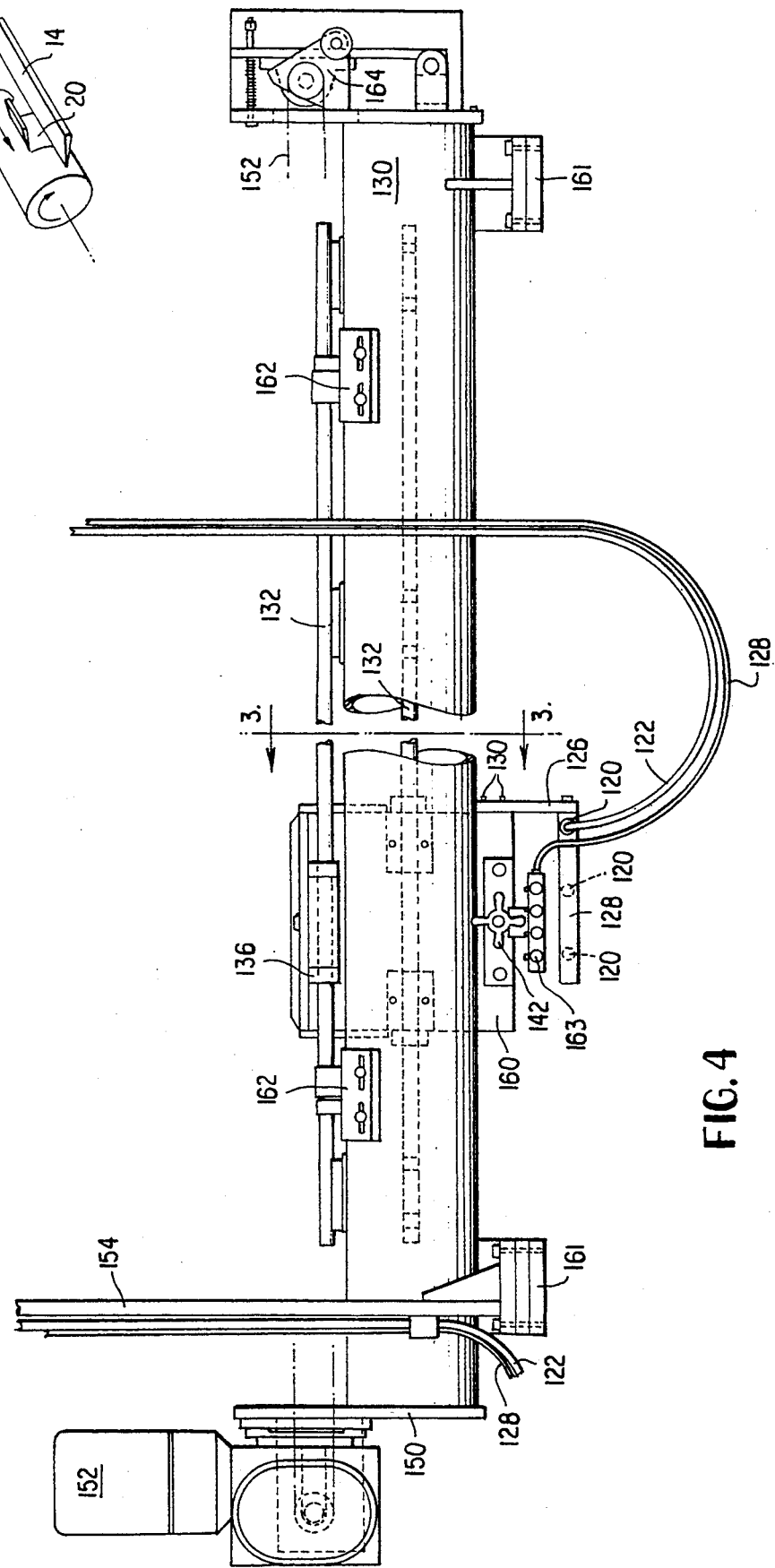
FIG. 4 is a side elevational view illustrating the apparatus of this invention.

Referring now to FIGS. 3 and 4 of the drawings, stationary doctor blade 14 is positioned below travelling doctor blade 16, these being entirely similar to corresponding blades 14 and 16 of the noted Brady patent. Secondary or travelling doctor blade 16 is located nearer to the drum surface than main or stationary doctor blade 14. Water jet nozzles fed by pressurized water are denoted as 120 and are fed by high pressure wash flexible hydraulic line 122, with each water jet 120 discharging a spray 124 substantially tangentially to rotating vacuum drum 12 having mud layer 18 on its surface. Bracket 126 is adjustably mounted by bolts 130, the bracket supporting a water chamber 128 which mounts two water jet nozzles 120. Bracket 131 mounts the indicated adjustable holder for travelling doctor blade 16. It will be understood that the exact manner of mounting the jet nozzles 120 between doctor blades 14 and 16 and beneath doctor blade 16 is not material for the practice of this invention.

Travelling doctor blade 16 can be moved in and out to cut more or less of the mud cake by rotating a handle 142. Blade 16 is, typically, moved to a distance of ¼ inch from the drum when the jet nozzles are activated. Bracket 131 is mounted on a reciprocating carriage 160. The carriage has four Teflon bearings 136 two of which ride, respectively, on each of two rods 132 which are fastened to a machined pipe 130, the latter mounted on pipe end supports 161. In turn, supports 161 rest on vertical columns, not illustrated. The carriage is moved back and forth by a chain 152 fastened to the carriage and driven by a variable speed motor and gearing 153, the latter mounted on motor support bracket 150 carried by one end of pipe 130. Switches 162 mounted on pipe 130 change the direction of which way the carriage 160 travels. Namely, each time a switch 162 is struck or bumped by the carriage, the carriage changes direction. Hence carriage 160 reciprocates between switches 162. The locations of switches 162 can be adjusted to ensure that travelling doctor blade 16 covers the entire filter drum width. Teflon bearings 136 are water flushed for lubrication and cleaning. The water flow to the Teflon bearings is adjusted by valves 163 and this flow supplied by conduits 138 downstream of the valves and to the valves by flexible hose 128 at 15–20 lb. pressure. The chain is kept taut by a chain tensioner 164. Vertical hose holder 154 supports hoses 122 and 128.

It will be understood that the traversing mechanism indicated at FIGS. 3, 4, and 5 of the noted Brady patent may be employed for moving the travelling doctor blade 16 back and forth along the width of the rotating vacuum drum. It is only necessary to add one or more of the jet nozzles 120.

I claim:

1. An apparatus for removing a mud layer from the porous surface of a rotating vacuum drum, the drum rotatable about a horizontal axis and having a lower portion thereof in a vat having therein a mud slurry, a main doctor blade positioned along and contiguous to the drum surface, the main doctor blade being stationary and of a length substantially equal to the width of the drum, a secondary doctor blade positioned along and contiguous to the drum surface, said secondary doctor blade being of a length less than the width of the drum, means for reciprocating said secondary doctor blade along the width of the drum, both said doctor blades adapted to scrape off a portion only of a mud layer from the drum surface, the secondary doctor blade adapted to contact and scrape off a portion only of a mud layer on the drum prior to the main doctor blade contacting and scraping off a portion of mud on the drum, both doctor blades spaced from the drum surface, said secondary doctor blade located nearer to the drum surface than said main doctor blade, said doctor blades being substantially vertically aligned, a nozzle, said nozzle located between said doctor blades, said nozzle positioned to direct a jet of water tangentially against that portion of the drum surface beneath said main doctor blade concurrently with reciprocating movement of said secondary doctor blade, said nozzle reciprocating with said secondary doctor blade, said drum rotating in a direction from said secondary doctor blade towards said main doctor blade, and said jet of water is directed in the same direction as drum rotation.

2. A method of delivering a calcium carbonate containing mud slurry to a lime kiln, the method including the steps of continuously feeding a calcium carbonate containing mud slurry to a vat having therein a lower portion of a rotating, porous surface vacuum drum, placing the interior of the drum under a vacuum to thereby form a mud layer on the surface of the drum, continuously scraping off a portion of less than the entire width of the drum and less than the entire thickness of the mud layer on the drum by a secondary doctor blade reciprocating across the drum, said secondary doctor blade being of a width less than the width of the drum, transporting the scraped off mud portion from the secondary doctor blade to a lime kiln, continuously scraping off a portion less than the entire thickness of the remaining mud layer on the drum which has not been scraped off by said secondary doctor blade spaced from the drum surface by a stationary main doctor blade, said secondary doctor blade located nearer to the drum surface than the main doctor blade, periodically tangentially spraying the exterior porous surface of said drum over an area below said secondary doctor blade and to beneath said stationary, main doctor blade, said doctor blades being substantially vertically aligned, the secondary doctor blade located above the main doctor blade, said tangential spraying reciprocating across the drum with the reciprocating of said secondary doctor blade across the drum, said drum rotating in a direction from said secondary doctor blade towards said main doctor blade, and said jet of water is directed in the same direction as drum rotation.

3. The method of claim 2 wherein the secondary doctor blade contacts the mud layer prior to the stationary main doctor blade contacting the mud layer.

4. The method of removing a mud slurry layer from the porous surface of a rotating drum, the method including the steps of continuously feeding a mud slurry to a vat having therein a lower portion of a porous surface vacuum drum rotating about a horizontal axis, placing the interior of the drum under a vacuum to thereby continuously form a mud layer on the surface of the drum, scraping off a portion of the mud layer less than the entire width of the drum and less than the entire thickness of the mud layer on the drum by a secondary doctor blade reciprocating across the drum, continuously scraping off a portion less than the entire thickness of the remaining mud layer on the drum which has not been scraped off by said secondary doctor blade by a stationary, main doctor blade extending across substantially the entire width of the drum, said secondary doctor blade being of a width substantially less than the width of the drum, both said doctor blades spaced from the drum surface, said doctor blades being substantially vertically aligned, said secondary doctor blade located nearer to the drum surface than the main doctor blade, periodically directing a jet of water substantially tangentially against the exterior surface of said drum over an area below said secondary doctor blade and to beneath said main doctor blade, said tangential jet reciprocating concurrently with the reciprocation of said secondary doctor blade across the drum, said drum rotating in a direction from said secondary doctor blade towards said main doctor blade, and said jet of water is directed in the same direction as drum rotation.

5. The method of claim 4 wherein said secondary doctor blade contacts the mud to be removed from the drum surface prior to the main doctor blade contacting the mud to be removed from the drum surface.

6. The apparatus of claim 1 wherein that portion of the drum struck by the water jet is of a width substantially equal to the length of said secondary doctor blade.

7. The method of claim 2 wherein said area below said secondary doctor blade struck by the water jet is of a width substantially equal to the length of said secondary doctor blade.

8. The method of claim 4 wherein said area below said secondary doctor blade struck by the water jet is of a width substantially equal to the length of said secondary doctor blade.

* * * * *